United States Patent
Park et al.

(10) Patent No.: US 9,267,618 B2
(45) Date of Patent: Feb. 23, 2016

(54) MICROVALVE DEVICE AND METHOD OF MANUFACTURING THE SAME

(75) Inventors: Chin-sung Park, Yongin-si (KR); Won-jong Jung, Seongnam-si (KR); Jae-young Kim, Seoul (KR); Joon-ho Kim, Seongnam (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 616 days.

(21) Appl. No.: 13/110,452

(22) Filed: May 18, 2011

(65) Prior Publication Data

US 2011/0286895 A1    Nov. 24, 2011

Related U.S. Application Data

(63) Continuation-in-part of application No. 12/959,719, filed on Dec. 3, 2010.

(30) Foreign Application Priority Data

May 18, 2010  (KR) .................. 10-2010-0046592
Feb. 23, 2011 (KR) .................. 10-2011-0016029

(51) Int. Cl.
*B01L 99/00* (2010.01)
*F16K 99/00* (2006.01)
*B01L 3/00* (2006.01)

(52) U.S. Cl.
CPC ....... *F16K 99/0059* (2013.01); *B01L 3/502707* (2013.01); *B01L 3/502738* (2013.01); *F16K 99/0001* (2013.01); *F16K 99/0015* (2013.01); *B01L 2300/0816* (2013.01); *B01L 2300/0887* (2013.01); *B01L 2300/123* (2013.01); *B01L 2400/0638* (2013.01); *F16K 2099/008* (2013.01); *F16K 2099/0084* (2013.01)

(58) Field of Classification Search
CPC combination set(s) only.
See application file for complete search history.

(56) References Cited

U.S. PATENT DOCUMENTS

| | | | |
|---|---|---|---|
| 5,593,130 A | 1/1997 | Hansson et al. | |
| 6,129,331 A | 10/2000 | Henning et al. | |
| 6,644,944 B2 * | 11/2003 | Karp | 417/566 |
| 6,793,753 B2 | 9/2004 | Unger et al. | |
| 7,258,774 B2 | 8/2007 | Chou et al. | |
| 7,445,926 B2 * | 11/2008 | Mathies et al. | 435/288.5 |

(Continued)

FOREIGN PATENT DOCUMENTS

| | | |
|---|---|---|
| GB | 2155152 A | 9/1985 |
| JP | 2000220766 A | 8/2000 |

(Continued)

OTHER PUBLICATIONS

Extended European Search Report for Application No. 11166573.3-2113 dated Jul. 15, 2011.

*Primary Examiner* — Paul Hyun
(74) *Attorney, Agent, or Firm* — Cantor Colburn LLP

(57) ABSTRACT

A microvalve device comprises: a first substrate having a first surface, where at least one fluidic channel is formed into the first surface of the first substrate; and at least one valve seat is formed in the fluidic channel; a second substrate having a second surface, the second substrate comprising at least one air channel and at least one air chamber formed on the second surface of the second substrate, where the air chamber is connected to the air channel; and an elastic film interposed between the first substrate and the second substrate, where an upper portion of the valve seat is lower than the first surface of the first substrate.

20 Claims, 9 Drawing Sheets

(56) References Cited

U.S. PATENT DOCUMENTS

| | | |
|---|---|---|
| 2002/0043638 A1 | 4/2002 | Kao et al. |
| 2002/0139947 A1 | 10/2002 | Wang |
| 2003/0196695 A1 | 10/2003 | O'Connor et al. |
| 2005/0072946 A1 | 4/2005 | Studer et al. |
| 2007/0200081 A1 | 8/2007 | Elizarov et al. |
| 2008/0271799 A1 | 11/2008 | Wimberger-Friedl et al. |
| 2009/0178934 A1 | 7/2009 | Jarvius et al. |
| 2009/0314368 A1 | 12/2009 | McAvoy et al. |
| 2011/0126911 A1* | 6/2011 | Kobrin et al. ............ 137/1 |

FOREIGN PATENT DOCUMENTS

| | | |
|---|---|---|
| WO | 0241994 A2 | 5/2002 |
| WO | 2006032044 A2 | 3/2006 |
| WO | 2010141326 A1 | 12/2010 |
| WO | 2011038458 A1 | 4/2011 |

* cited by examiner

MICROVALVE DEVICE AND METHOD OF MANUFACTURING THE SAME

CROSS-REFERENCE TO RELATED APPLICATIONS

This application is a continuation-in-part application of U.S. patent application Ser. No. 12/959,719, filed on Dec. 3, 2010, and claims priority to Korean Patent Application No. 10-2010-0046592, filed on May 18, 2010 and Korean Patent Application No. 10-2011-0016029, filed on Feb. 23, 2011, and all the benefits accruing therefrom under 35 U.S.C. §119, the contents of which in their entirety are herein incorporated by reference.

BACKGROUND

1. Field

The present disclosure relates to microvalve devices and methods of manufacturing the microvalve devices, and more particularly, to microvalve devices having a normally open type microvalve, in which an elastic film and a valve seat of the microvalve do not normally contact each other, and methods of manufacturing the microvalve devices.

2. Description of the Related Art

A clinical or environment-related sample may be analyzed by performing a series of biochemical, chemical, and mechanical processes. Currently, development of technologies for diagnosing or monitoring a biological sample is attracting increased attention. Due to its excellent accuracy and sensitivity, a developed molecular diagnosis method based on a nucleic acid is increasingly and broadly being used to diagnose infectious diseases and cancers, to study pharmacogenomics, and to develop new medicines. Microfluidic devices are commonly used to analyze a sample simply and precisely for the various purposes described above. In a microfluidic device, a plurality of sample inlets, sample outlets, microfluidic channels, reaction chambers, for example, are formed in a thin substrate and thus various tests may be simply performed on one sample.

From among the above-described microfluidic devices, microvalve devices having microvalves that control a sample and a reagent to flow to a desired location are currently developed and commercialized. For example, a microvalve device may include a thin elastic film interposed between two substrates, and a valve seat formed in a microfluidic channel of the substrates. In such a microvalve device, a microvalve is closed while the elastic film contacts the valve seat to prevent a sample from flowing through the microfluidic channel, and is open while the elastic film does not contact the valve seat to allow the sample to flow through the microfluidic channel.

In general, a microvalve device is manufactured as a normally closed type in which an elastic film and a valve seat normally contact each other. However, with the normally closed type, if a microvalve has not been used for a long time, an elastic film may naturally stick to a surface of a valve seat due to a chemical or physical reaction therebetween, and an initialization operation for separating the elastic film from the valve seat may be required. In addition, the elastic film may be permanently bonded to the valve seat in a process of permanently bonding the elastic film between the two substrates, and the microvalve may not operate normally. Accordingly, an additional process for preventing the elastic film from being bonded to the valve seat while the elastic film is permanently bonded between the two substrates may be required. Thus, the microvalve device may have a complicated manufacturing process and a high manufacturing cost.

SUMMARY

Provided herein are embodiments of microvalve devices having a normally open type microvalve, the default state of which is an open state and an elastic film and a valve seat of the microvalve do not contact each other in the open state.

Provided herein are methods of manufacturing the microvalve devices.

Additional aspects will be set forth in part in the description which follows and, in part, will be apparent from the description, or may be learned by practice of the presented embodiments.

According to an aspect of the present disclosure, a microvalve device comprises: a first substrate having a first surface, wherein at least one fluidic channel are formed into the first surface of the first substrate; and at least one valve seat are formed in the fluidic channel; a second substrate having a second surface including at least one air channel, wherein at least one air chamber are formed on the second surface of the second substrate, and the air chamber is connected to the air channel; and an elastic film interposed between the first substrate and the second substrate, where an upper portion of the valve seat is lower than the first surface of the first substrate.

In an embodiment, when a controlling air pressure is not applied to the air chamber through the air channel, the upper portion of the valve seat may be spaced apart from the elastic film.

In an embodiment, when the controlling air pressure is not applied to the air chamber through the air channel, a distance between the upper portion of the valve seat and the elastic film may be greater than zero (0) μm and equal to or less than about 100 μm.

In an embodiment, when the controlling air pressure is not applied to the air chamber through the air channel, the distance between the upper portion of the valve seat and the elastic film may be greater than 0 μm and equal to or less than about 50 μm.

In an embodiment, when the controlling air pressure is not applied to the air chamber through the air channel, the distance between the upper portion of the valve seat and the elastic film may be greater than 0 μm and equal to or less than about 20 μm.

In an embodiment, when the controlling air pressure is applied to the air chamber through the air channel, the elastic film may be deflected to contact the valve seat and block a flow of a fluid in the fluidic channel.

In an embodiment, the first surface of the first substrate and the second surface of the second substrate may be disposed to face each other.

In an embodiment, the fluidic channel may be formed into the first surface of the first substrate in the shape of a groove and the valve seat may protrude from a bottom surface of the fluidic channel.

In an embodiment, a height of the valve seat may be less than a depth of the fluidic channel and may be greater than zero μm.

In an embodiment, the valve seat may be formed along a direction substantially perpendicular to a width direction of the fluidic channel.

In an embodiment, the air chamber and the valve seat may be formed to face each other.

In an embodiment, the air chamber and the valve seat may have substantially the same width.

In an embodiment, the air chamber may be formed on the second surface of the second substrate in the shape of a groove.

In an embodiment, the microvalve device may further comprise first holes formed in a third surface of the first substrate which is substantially opposite to the first surface of the first substrate, where the first holes are connected to the fluidic channel; and second holes formed in a fourth surface of the second substrate which is substantially opposite to the second surface of the second substrate, where the second holes are connected to the air channel.

In an embodiment, the microvalve device may further comprise at least one reaction chamber formed in the first surface of the first substrate or the second surface of the second substrate.

In an embodiment, the elastic film may include polydimethylsiloxane ("PDMS").

In an embodiment, the first substrate and the second substrate may comprises glass or plastic.

According to another aspect of the present disclosure, a method of manufacturing a microvalve device includes: forming at least one fluidic channel into a first surface of a first substrate and at least one valve seat in the fluidic channel by etching the first surface of the first substrate; forming at least one air chamber on a second surface of a second substrate and at least one air channel connected to the air chamber in the second substrate by etching the second surface of the second substrate; and bonding the first surface of the first substrate and the second surface of the second substrate to face each other while interposing an elastic film between the first substrate and the second substrate, where an upper portion of the valve seat is lower than the first surface of the first substrate.

In an embodiment, the forming the fluidic channel and the valve seat may comprise: sequentially coating an etching mask and a photoresist on the first surface of the first substrate; patterning and removing the etching mask and the photoresist in a region corresponding to the fluidic channel of the first surface of the first substrate, and remaining the etching mask in a region corresponding to the valve seat of the first surface of the first substrate; and partially wet etching the first surface of the first substrate until the upper portion of the valve seat is lower than the first surface of the first substrate.

In an embodiment, the patterning the etching mask and the photoresist may include patterning the photoresist by exposing and developing the photoresist; and patterning the etching mask by removing a portion of the etching mask, from which the photoresist is removed, using a deep reactive ion etching ("DRIE") method.

In an embodiment, when a width of the etching mask for forming the valve seat is $W_{ETCH}$ and an etching depth of the first surface of the first substrate is D, the following inequality may be hold: $W_{ETCH} < 2 \times D$.

In an embodiment, the bonding the first surface of the first substrate and the second surface of the second substrate to face each other while interposing the elastic film between the first substrate and the second substrate may comprise: interposing the elastic film between the first surface of the first substrate and the second surface of the second substrate; processing the first substrate, the second substrate and the elastic film using oxygen ($O_2$) plasma; and heating the first substrate, the second substrate and the elastic film in an oven.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
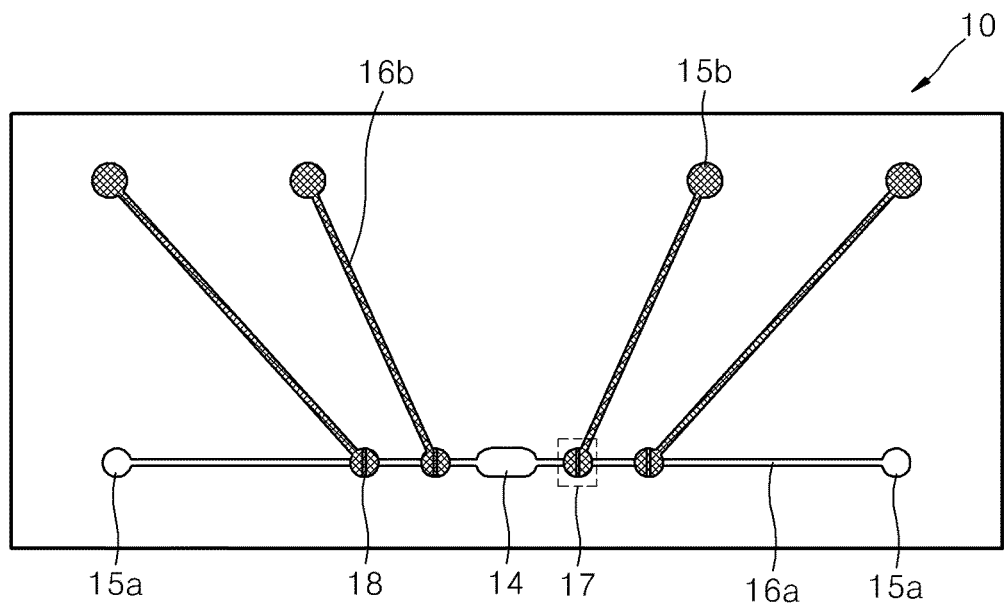
FIG. 1 is a top plan view of an embodiment of a microvalve device according to the present disclosure.

Embodiments now will be described more fully hereinafter with reference to the accompanying drawings, in which embodiments are shown. These embodiments may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the disclosure.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope thereof unless otherwise claimed. No language in the specification should be construed as indicating any non-claimed element as essential to the practice of the embodiments as used herein.

Hereinafter, the embodiments will be described in detail with reference to the accompanying drawings.

FIG. 1 is a top plan view of an embodiment of a microvalve device 10 according to the present disclosure. Referring to FIG. 1, the microvalve device 10 may include a plurality of first holes 15a for inflow or outflow of a sample or a reagent, a plurality of second holes 15b for inflow or outflow of air, a reaction chamber 14 in which a chemical or biological reaction of a sample occurs, one or more fluidic channels 16a through which a sample or a reagent moves, one or more air channels 16b through which air moves, and a plurality of valve seats 18 formed in the fluidic channels 16a. The valve seats 18 and an elastic film collectively form microvalves 17 that accurately controls flow of a sample to a predetermined location.

In an embodiment, the first holes 15a, the second holes 15b, the reaction chamber 14, the fluidic channels 16a, the air channels 16b, and the valve seats 18 are formed in a single substrate in FIG. 1, as will be described in greater detail later, but embodiments of the present disclosure is not limited thereto. In an alternative embodiment, they may be separately formed in two thin substrates facing each other. In one embodiment, for example, the first holes 15a, the reaction chamber 14, the fluidic channels 16a, and the valve seats 18 may be formed in a substrate, and the second holes 15b and the air channels 16b may be formed in another substrate. In FIG. 1, for convenience of description, reference numerals are representatively given to only one reaction chamber 14, two first holes 15a, one second hole 15b, one fluidic channel 16a, one air channel 16b, and one valve seat 18. However, an embodiment of the microvalve device may include a plurality of reaction chambers 14, a plurality of first holes 15a, a plurality of second holes 15b, a plurality of fluidic channels 16a, a plurality of air channels 16b, and a plurality of valve seats 18. In an embodiment of the microvalve device 10, the alignment of the reaction chamber 14, the first and second holes 15a and 15b, the fluidic channels 16a, the air channels 16b, and the valve seats 18 are not limited to the alignment thereof shown in FIG. 1, and the alignment and numbers of the reaction chamber 14, the first and second holes 15a and 15b, the fluidic channels 16a, the air channels 16b, and the valve seats 18 may vary based on use of the microvalve device 10 and selection of a designer.

Figure 2:
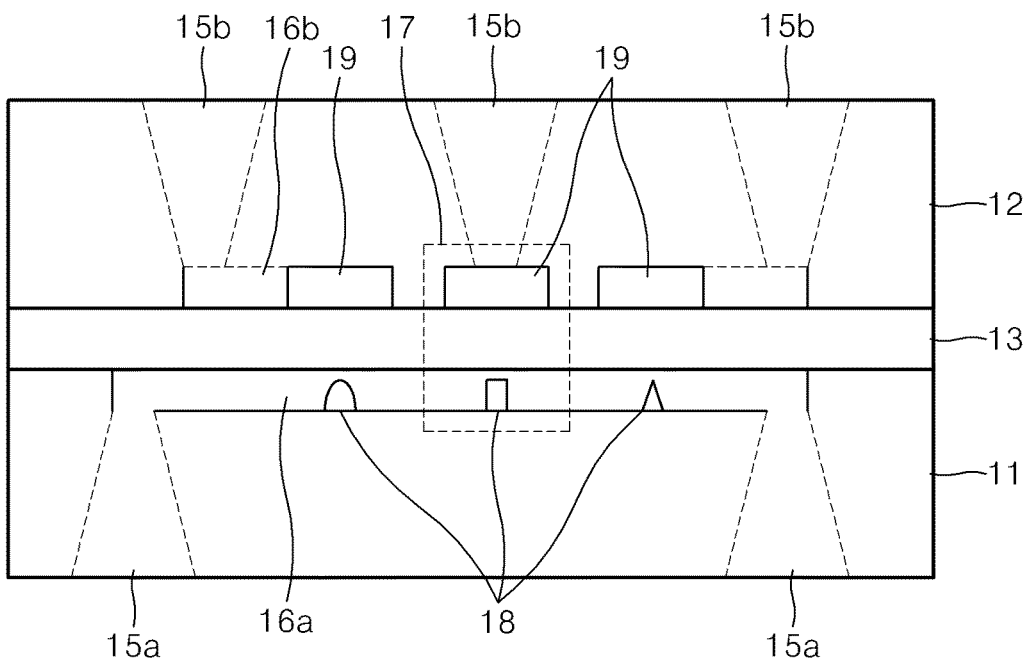
FIG. 2 is a cross-sectional view of an embodiment of a microvalve device illustrated in FIG. 1.

The microvalves 17 may be formed in the fluidic channels 16a, through which a sample or a reagent moves, and control, e.g., pass or block, the flow of the sample or the reagent in the microfluidic channels 16a. The microvalves 17 may include a thin elastic film and the valve seats 18. FIG. 2 is a cross-sectional view of the embodiment of the microvalve device 10 in FIG. 1 showing an alignment of the valve seats 18 in the fluidic channels 16a of the microvalve device 10. Referring to FIG. 2, the microvalve device 10 may include a first substrate 11, a second substrate 12 facing the first substrate 11, and a thin elastic film 13 interposed between the first and second substrates 11 and 12. The first and second substrates 11 and 12 may be formed of a transparent material such as glass or plastic, for example. Also, the elastic film 13 may be formed of a polymer material such as polydimethylsiloxane ("PDMS"), for example.

As illustrated in FIG. 2, the first holes 15a may be formed in the first substrate 11, and the second holes 15b may be formed in the second substrate 12. As will be described in greater detail later, the first holes 15a may be fluid holes for providing a fluid such as a sample, and the second holes 15b may be air pressure holes for providing air to push the elastic film 13. The first holes 15a may be connected to the fluidic channels 16a formed in a surface of the first substrate 11 facing the second substrate 12, and may provide a fluid into the fluidic channels 16a. Also, the second holes 15b may be connected to the air channels 16b formed in a surface of the second substrate 12 facing the first substrate 11, and may provide air into the air channels 16b. The valve seats 18 may be formed in the fluidic channels 16a. In an embodiment, the valve seats 18 has upper portions that are round, flat, and pointed, as shown in FIG. 2, but the shape of the valve seats 18 are not limited thereto. As illustrated in FIG. 2, the upper portions of the valve seats 18 are disposed lower than an upper surface of the first substrate 11. In an embodiment, air chambers 19 connected to the air channels 16b are formed in a surface of the second substrate 12 at a position corresponding to the valve seats 18. The air chambers 19 allow air supplied through the air channels 16b to push the elastic film 13 toward the valve seats 18. Accordingly, one valve seat 18, one air chamber 19 and the elastic film 13 collectively define one microvalve 17. Although only some elements of the microvalve device 10 are illustrated in FIG. 2, other elements of the microvalve device 10, e.g., a plurality of reaction chambers 14, may also be provided in the two opposite surfaces of the first and second substrates 11 and 12.

Figure 3A:
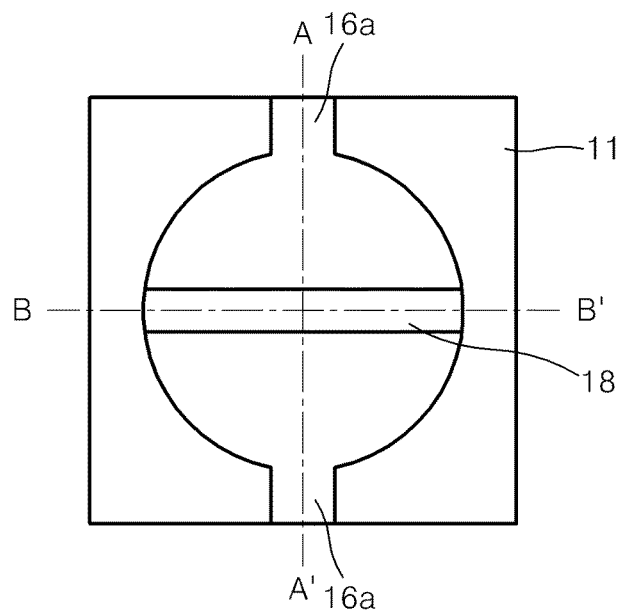
FIGS. 3A and 3B are top plan views of an embodiment of a microvalve formed in the microvalve device illustrated in FIG. 1, according to the present disclosure.
Figure 3B:
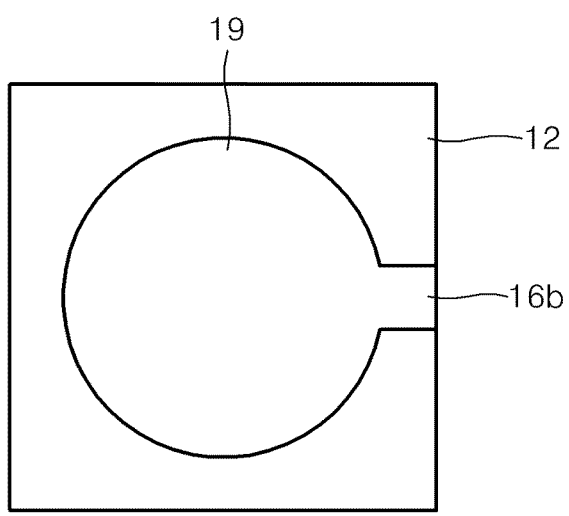

FIGS. 3A and 3B are top plan views of an embodiment of the microvalve 17 formed in the microvalve device 10 illustrated in FIG. 1, according to the present disclosure. FIG. 3A shows a portion of the microvalve 17 formed in the first substrate 11, and FIG. 3B shows a portion of the microvalve 17 formed in the second substrate 12.

Referring to FIG. 3A, the valve seat 18 is formed to cross a direction of a width of the fluidic channel 16a formed in the shape of a groove on a surface of the first substrate 11. In an embodiment, the valve seat 18 may be formed substantially perpendicular to the direction of the width of the fluidic channel 16a. In an embodiment, the width of the fluidic channel 16a may be slightly increased where the valve seat 18 is formed such that the microvalve 17 operates substantially effectively. In one embodiment, for example, the fluidic channel 16a and the valve seat 18 may be formed in a surface of the first substrate 11 facing the second substrate 12. Although not shown in FIG. 3A, the elastic film 13 is formed overlapping the valve seat 18.

Referring to FIG. 3B, the air chamber 19 may be formed in a surface of the second substrate 12 facing the first substrate 11. The air chamber 19 provides air to push the elastic film 13 toward the valve seat 18 with a pressure during a closing operation of the microvalve 17. Also, the air channel 16b formed in the shape of a groove on the surface of the second substrate 12 facing the first substrate 11 is connected to the air chamber 19. In an embodiment, the fluidic channel 16a and the air channel 16b are aligned orthogonally to each other as shown in FIGS. 3A and 3B, but the alignment of the fluidic channel 16a and the air channel 16b is not limited thereto. In an alternative embodiment, the fluidic channel 16a and the air channel 16b may be aligned to form any arbitrary angle, or may be aligned parallel to each other. The microvalve 17 and the air chamber 19 may be formed at corresponding positions of the first and second substrates 11 and 12, respectively, with the elastic film 13 interposed therebetween. The air chamber 19 and the valve seat 18 may have a same width.

Figure 4A:
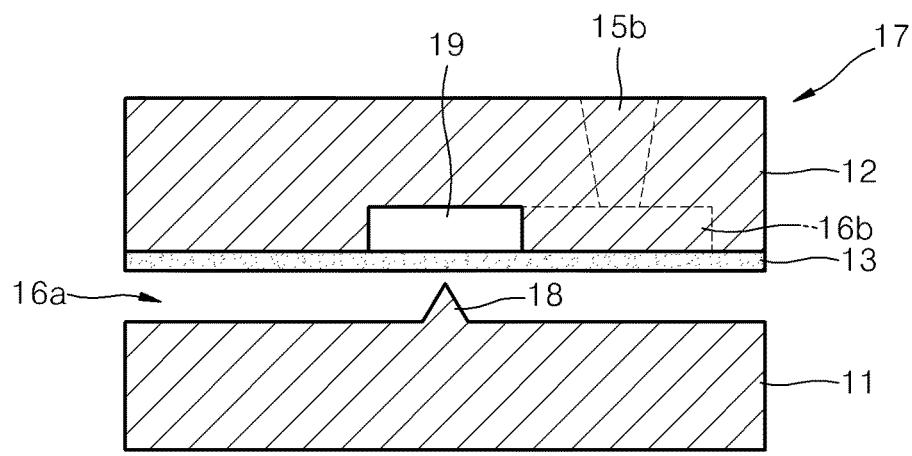
FIG. 4A is a cross-sectional view taken along line A-A' of an embodiment of a microvalve illustrated in FIG. 3A.

FIG. 4A is a cross-sectional view taken along line A-A' of an embodiment of the microvalve 17 illustrated in FIG. 3A. Referring to FIG. 4A, the valve seat 18 protrudes from a bottom surface of the fluidic channel 16a formed in an upper surface of the first substrate 11 facing the second substrate 12. In such an embodiment, a height of the valve seat 18 may be greater than zero μm and may be less than a depth of the fluidic channel 16a. In an embodiment, the air chamber 19 is formed at a position corresponding to the valve seat 18, e.g., by etching a surface of the second substrate 12 facing the first substrate 11. The air chamber 19 and the valve seat 18 are separate from each other by the elastic film 13 interposed between the first and second substrates 11 and 12. As illustrated in FIG. 4A, the upper portion of the valve seat 18 is disposed close the elastic film 13, but does not contact the elastic film 13. In an embodiment, the fluidic channel 16a is connected to the first hole 15a formed in the first substrate 11 to allow inflow or outflow of a sample. As illustrated by dashed lines in FIG. 4A, the air chamber 19 may be connected to the air channel 16b and the second hole 15b formed in the second substrate 12 to allow inflow or outflow of air.

Figure 4B:
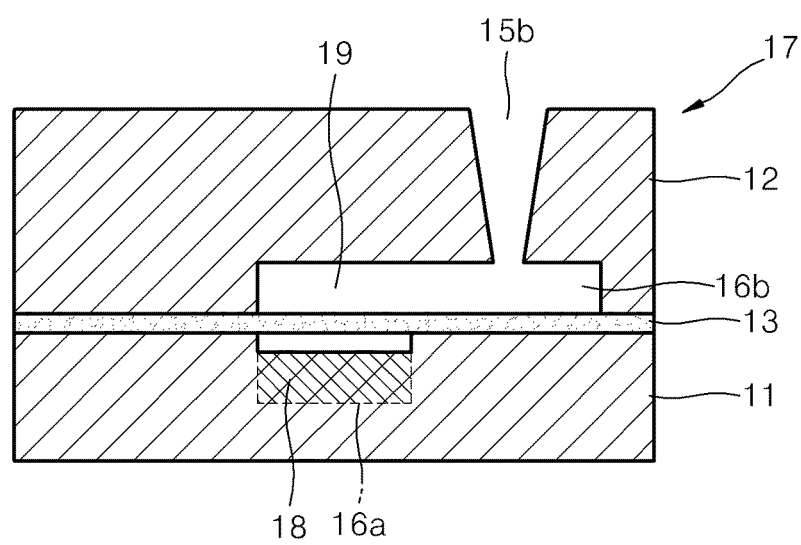
FIG. 4B is a cross-sectional view taken along line B-B' of an embodiment of a microvalve illustrated in FIG. 3A.

FIG. 4B is a cross-sectional view taken along line B-B' of an embodiment of the microvalve 17 in FIG. 3A. Referring to FIG. 4B, the air chamber 19, the air channel 16b, and the second hole 15b are formed in the second substrate 12, and the valve seat 18 is formed in the first substrate 11. The fluidic channel 16a (shown by a dashed line in FIG. 4B) is connected to front and back sides of the valve seat 18; as used herein, the term "front" describes a portion of the valve seat 18 closest to the fluidic channel 16a from which a fluid flows into the microvalve 17 and the term "back" describes a portion of the valve seat 18 closest to the fluidic channel 16a to which a fluid flows out of the microvalve 17. The elastic film 13 is interposed between the first and second substrates 11 and 12. As described above referring to FIG. 4A, the upper portion of the valve seat 18 does not contact the elastic film 13. For this, as illustrated in FIG. 4B, the height of the valve seat 18 with respect to the bottom surface of the fluidic channel 16a may be less than the height of the upper surface of the first substrate 11 with respect to the bottom surface of the fluidic channel 16a. In such an embodiment, the upper portion of the valve seat 18 does not contact the elastic film 13, and the upper portion of the valve seat 18 and the elastic film 13 are spaced apart from each other. A distance between the upper portion of the valve seat 18 and the elastic film 13 may vary based on the width and the depth of the fluidic channel 16a, and may be greater than 0 micrometer (μm) and less than or equal to about 100 μm. In alternative embodiment, the distance between the upper portion of the valve seat 18 and the elastic film 13 may be greater than zero μm and less than or equal to about 50 μm. In an embodiment, where the depth of the fluidic channel 16a is, for example, about 100 μm, the distance between the upper portion of the valve seat 18 and the elastic film 13 may be greater than zero μm and less than or equal to about 20 μm.

Figure 5A:
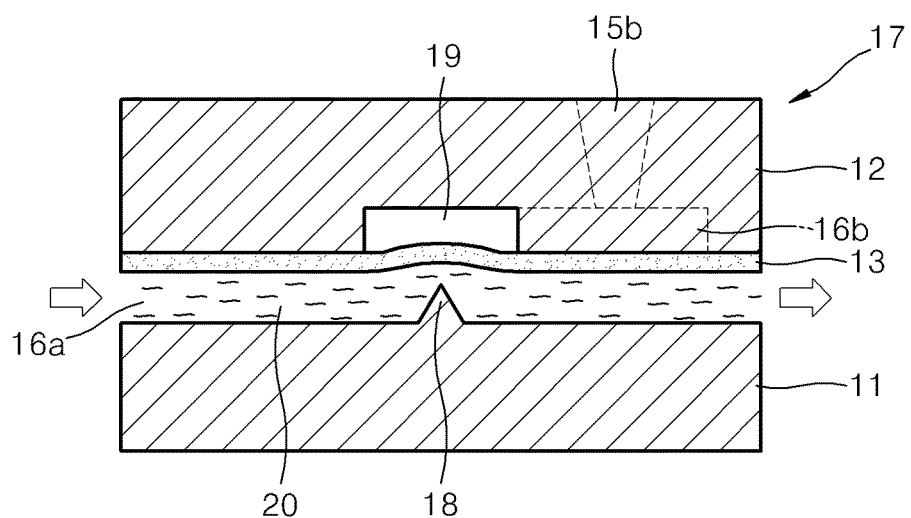
FIG. 5A is a cross-sectional view showing an opening operation of the embodiment of a microvalve illustrated in FIG. 4A.
Figure 5B:
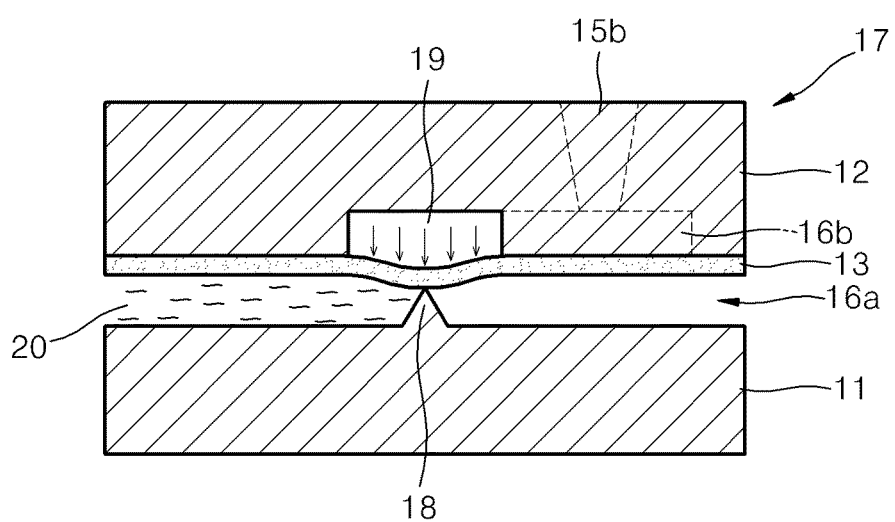
FIG. 5B is a cross-sectional view showing a closing operation of the embodiment of a microvalve illustrated in FIG. 4A.
Figure 5C:
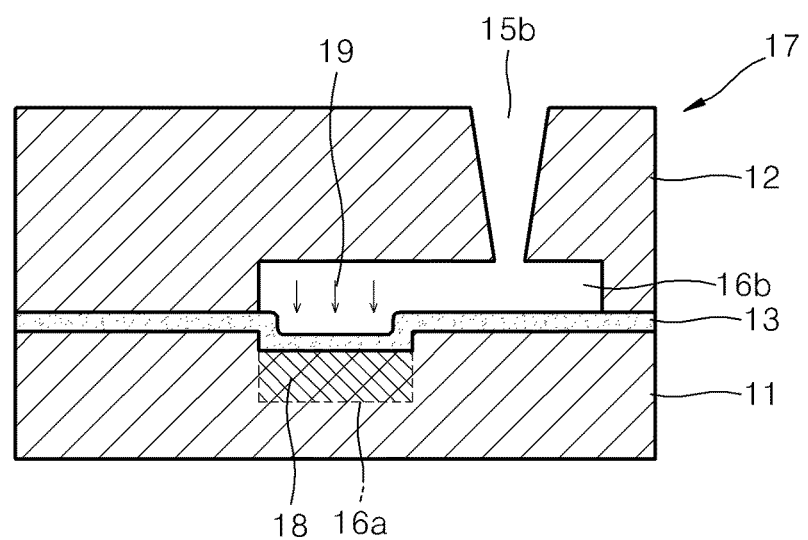
FIG. 5C is a cross-sectional view showing a closing operation of the embodiment of a microvalve illustrated in FIG. 4B.

FIGS. 5A through 5C are cross-sectional views showing opening and closing operations of the embodiment of a microvalve 17 illustrated in FIGS. 4A and 4B. In particular, FIG. 5A is a cross-sectional view showing an opening operation of the embodiment of a microvalve 17 illustrated in FIG. 4A, FIG. 5B is a cross-sectional view showing a closing operation of the embodiment of a microvalve 17 illustrated in FIG. 4A, and FIG. 5C is a cross-sectional view showing a closing operation of the embodiment of a microvalve 17 illustrated in FIG. 4B. Referring to FIG. 5A, since the upper portion of the valve seat 18 does not contact the elastic film 13 as described above referring to FIGS. 4A and 4B, the microvalve 17 is a normally open type, e.g., the default state of the microvalve 17 is an open state. Accordingly, the microvalve 17 is normally open and thus, for example, a fluid 20 provided into the fluidic channel 16a through the first hole 15a may pass through the microvalve 17.

As illustrated in FIGS. 5B and 5C, air is provided into the air chamber 19 through the second hole 15b to close the microvalve 17. The air provided into the air chamber results in a controlling air pressure in the air chamber. The controlling air pressure is of a sufficient pressure to deform the elastic film 13 as described below, and as such may be greater than the atmospheric pressure surrounding the microfluidic device. In such an embodiment, the elastic film 13 under the air chamber 19 is deformed toward the valve seat 18 by the applied controlling air pressure. When the air is provided at a sufficient pressure, the elastic film 13 may contact the valve seat 18, e.g., the upper portion of the valve seat 18, and may completely fill the gap between the elastic film 13 and the valve seat 18. Thus, the fluid 20 in the fluidic channel 16a is blocked by the microvalve 17 and does not flow through the microvalve 17. In such an embodiment, the sufficient pressure of the air is influenced by various factors such as a material of the elastic film 13, the distance between the valve seat 18 and the elastic film 13, the width and the depth of the fluidic channel 16a, a geometrical shape of the air chamber 19, and surface states and geometrical shapes of the valve seat 18 and the elastic film 13, and thus is not specifically defined here.

Forming of the microvalve 17 as a normally open type as described above may have various advantages. Initially, when the elastic film 13 is interposed between the first and second substrates 11 and 12, the elastic film 13 may be permanently bonded to the first and second substrates 11 and 12. In his case, it is not desirable that the elastic film 13 is permanently bonded to the valve seat 18. Accordingly, in contrast to the microvalve 17 described above, in a normally closed type in which the valve seat 18 normally contacts the elastic film 13, a surface of the valve seat 18 may require an additional coating so that the valve seat 18 is not permanently bonded to the elastic film 13. As such, the microvalve device 10 may have a complicated manufacturing process. Also, even after the microvalve device 10 is completely manufactured, air should be provided into the air channel 16b at a high pressure to confirm that the valve seat 18 and the elastic film 13 are separated from each other, and thus a gap that may cause a leakage of the fluid 20 may occur between the first and second substrates 11 and 12 and the elastic film 13. Accordingly, a normally closed type microvalve may not be effectively used in a high pressure environment. In contrast, in an embodiment of the microvalve 17 as disclosed herein, since the valve seat 18 and the elastic film 13 do not normally contact each other, the above problem may be effectively prevented and the manufacturing process of the microvalve device 10 may be substantially simplified. In particular, since the valve seat 18 and the elastic film 13 are not permanently bonded to each other, the microvalve device 10 may be manufactured with a relatively greater bonding force between the first and second substrates 11 and 12 and the elastic film 13, and a leakage of the fluid 20 may be effectively prevented in a high pressure environment.

Also, when the elastic film 13 normally contacts the valve seat 18, if the elastic film 13 contacts the valve seat 18 for a long time, the elastic film 13 may stick to the surface of the valve seat 18 and may not be separated from the valve seat 18 due to a chemical or physical reaction therebetween. Accordingly, if the microvalve device 10 has not been used for a long time, an initialization operation for separating the elastic film 13 and the valve seat 18 from each other may be required. However, in an embodiment of the microvalve device 10 as disclosed herein, since the elastic film 13 does not normally contact the valve seat 18, the initialization operation is not required. Accordingly, the flow of the fluid 20 in the microvalve device 10 may be efficiently controlled without additional processes.

The microvalve device 10 may be manufactured by, for example, forming a plurality of grooves on the opposing surfaces of the first and second substrates 11 and 12, embodiments of which may be formed of glass or plastic or other material with similar characteristics. According to the positions and shapes of the grooves formed in the opposing surfaces of the first and second substrates 11 and 12, each of the grooves may function as the reaction chamber 14, the fluidic channel 16a, the air channel 16b, the valve seat 18, or the air chamber 19. Also, the first and second holes 15a and 15b may be formed by penetrating from non-opposing surfaces of the first and second substrates 11 and 12 into the fluidic channel 16a and the air channel 16b. As the elastic film 13 is interposed between and is permanently bonded to the first and second substrates 11 and 12 on which the reaction chambers 14, the fluidic channel 16a, the air channel 16b, the valve seat 18, the first and second holes 15a and 15b, and the air chamber 19 are formed, the microvalve device 10 may be completely manufactured. From among various methods of forming the reaction chamber 14, the fluidic channel 16a, the air channel 16b, the valve seat 18, and the air chamber 19 in the opposing surfaces of the first and second substrates 11 and 12, a wet etching method will be described below. However, the wet etching method is described as one embodiment, and alternative methods of forming the various components of the microvalve device 10 may also be used.

FIGS. 6A through 6D are cross-sectional views illustrating an embodiment of a method of manufacturing the valve seat 18 of the microvalve 17 illustrated in FIGS. 4A and 4B. In FIGS. 6A through 6D, left portions are cross-sections along a line in the first direction as shown in FIG. 4A, and right portions are cross-sections along a line in the second direction as shown in FIG. 4B. A wet etching method of forming the valve seat 18 will now be described with reference to FIGS. 6A through 6D.

Figure 6A:
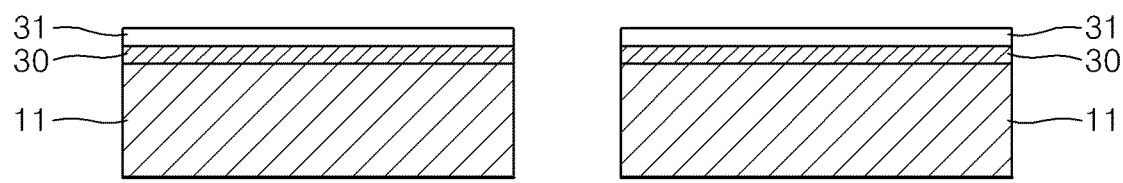
FIGS. 6A through 6D are cross-sectional views showing an embodiment of a method of manufacturing a valve seat of the microvalve in FIGS. 4A and 4B.

Initially, referring to FIG. 6A, an etching mask 30 and a photoresist 31 are sequentially coated on a surface of the first substrate 11 on which the valve seat 18 is to be formed. In one embodiment, for example, when the first substrate 11 is formed of glass, an embodiment of the etching mask 30 may be formed of polycrystalline silicon ("poly-Si").

Figure 6B:
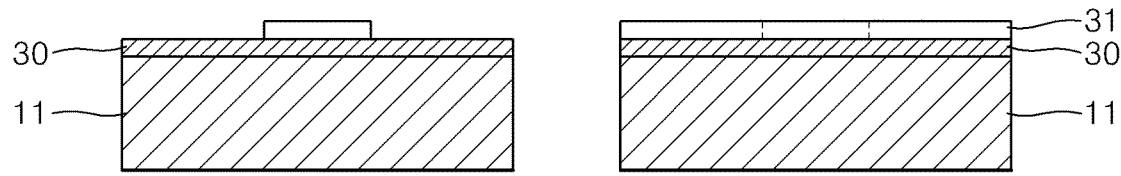

Then, referring to FIG. 6B, according to a generally used photolithography method, the photoresist 31 may be patterned by exposing and developing the photoresist 31. As such, as illustrated in the left portion of FIG. 6B, in the cross-section taken along line A-A' in FIG. 3A, a portion of the photoresist 31 for forming the valve seat 18 remains on only a center portion of the etching mask 30. On the other hand, as illustrated in the right portion of FIG. 6B, in the cross-section taken along line B-B' in FIG. 3A, the portion of the photoresist 31 for forming the valve seat 18 remains across the etching mask 30 corresponding to this portion of the microfluidic device 10. Although only the portion of the photoresist 31 for forming the valve seat 18 is illustrated in FIG. 6B, overall, embodiments include configurations, in which the photoresist 31 is also patterned on the etching mask 30 to form other elements such as the reaction chamber 14 and the fluidic channel 16a. In one embodiment, for example, in the right portion of FIG. 6B, dashed lines are illustrated in the photoresist 31. The dashed lines represent that, for example, the photoresist 31 is removed to form the fluidic channel 16a in front of and in back of the valve seat 18. That is, the photoresist 31 is patterned and removed in regions of the reaction chamber 14 and the fluidic channel 16a to be etched respectively into a groove, and remains in other regions.

Figure 6C:
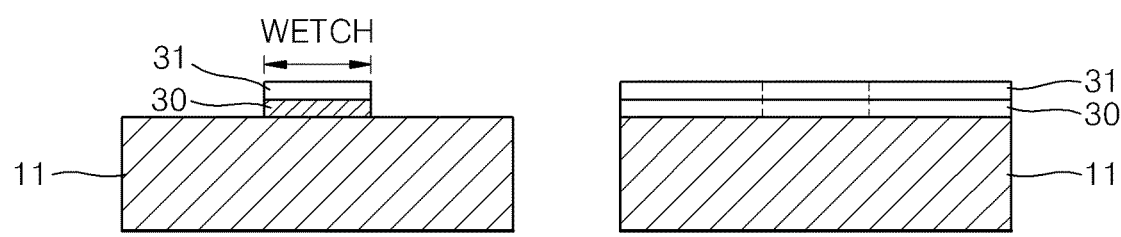

After that, as illustrated in FIG. 6C, the etching mask 30 is patterned into the same pattern as the photoresist 31. In one embodiment, for example, the etching mask 30 may be patterned by removing a portion of the etching mask 30 from which the photoresist 31 is removed using a deep reactive ion etching ("DRIE") method. As such, as illustrated in the left portion of FIG. 6C, in the cross-section taken along line A-A' in FIG. 3A, a portion of the etching mask 30 for forming the valve seat 18 remains on only a center portion of the first substrate 11. On the other hand, as illustrated in the right portion of FIG. 6C, in the cross-section taken along line B-B' in FIG. 3A, the portion of the etching mask 30 for forming the valve seat 18 remains across the first substrate 11. Although only the portion of the etching mask 30 for forming the valve seat 18 is illustrated in FIG. 6C, in one embodiment, overall, the etching mask 30 is also patterned to form other elements such as the reaction chamber 14 and the fluidic channel 16a. In one embodiment, for example, in the right portion of FIG. 6C, dashed lines are illustrated to represent that the etching mask 30 is removed to form the fluidic channel 16a in front of and in back of the valve seat 18. That is, the etching mask 30 is patterned and removed in regions of the reaction chamber 14 and the fluidic channel 16a to be etched into a corresponding groove, and remains in other regions.

Figure 6D:
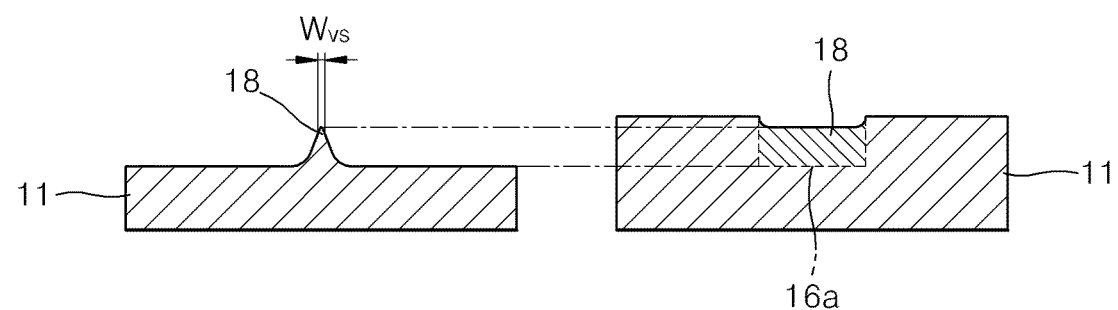

Lastly, referring to FIG. 6D, according to a general wet etching method, the first substrate 11 is etched. In such an embodiment, for example, a hydrofluoric acid ("HF") solution may be used as an etchant. As such, as illustrated in FIG. 6D, the fluidic channel 16a and the valve seat 18 may be formed together on an upper surface of the first substrate 11. The left portion of FIG. 6D shows a cross-section of the valve seat 18 taken along line A-A' in FIG. 3A, and the right portion of FIG. 6D shows a cross-section of the valve seat 18 taken along line B-B' in FIG. 3A. In the right portion of FIG. 6D, the fluidic channel 16a formed in front of and in back of the valve seat 18 is represented using a dashed line.

In the right portion of FIG. 6D, the height of the formed valve seat 18 is less than the height of the upper surface of the first substrate 11. Accordingly, a width $W_{etch}$ of the etching mask 30 in the left portion of FIG. 6C needs is appropriately controlled using general characteristics of wet etching to arrive at the configuration described above. In general, wet etching refers to isotropic etching in which all crystalline surfaces have substantially the same etching speed and thus an etched portion has a relatively round cross-section instead of a sharp vertical cross-section. Accordingly, a width of a portion that remains when the etching mask 30 is etched is gradually increased in a downward direction, i.e., towards the bottom of the second substrate 12. Also, a width of an upper surface of the remaining portion is reduced as an etching depth is increased. If a substrate to be etched is a glass substrate and an etching mask is formed of poly-Si, various characteristics of a wet etching may be generally represented by Equation 1.

$$W_{GLASS} = W_{ETCH} - 2 \times D_{GLASS} \quad \text{[Equation 1]}$$

In Equation 1, $W_{GLASS}$ represents a width of an upper surface of a portion that remains when the glass substrate is etched, $W_{ETCH}$ represents a width of the etching mask, and $D_{GLASS}$ represents an etching depth of the glass substrate. The above correlation may also be applied to the width of the portion of the etching mask 30 for forming the valve seat 18. For example, when a width of the upper portion of the valve seat 18 at the same height as the upper surface of the first substrate 11 is $W_{vs}$, in order to make the height of the ultimately formed valve seat 18 less than the height of the upper surface of the first substrate 11, the width $W_{vs}$ may be less than zero µm. Accordingly, when an etching depth of the first substrate 11, i.e., the depth of the fluidic channel 16a, is about 100 µm and the width $W_{vs}$ is about zero µm, the width $W_{ETCH}$ of the portion of the etching mask 30 for forming the valve seat 18 may be less than about 200 µm. In brief, to make the height of the valve seat 18 less than the height of the upper surface of the first substrate 11, a correlation between the width $W_{ETCH}$ of the etching mask 30 and an etching depth D of the first substrate 11 may be represented by Inequality 2.

$$W_{ETCH} < 2 \times D \quad \text{[Inequality 2]}$$

A distance between the upper portion of the valve seat 18 and the upper surface of the first substrate 11 may vary according to the width and the depth of the fluidic channel 16a, and may be, for example, greater than zero µm and equal to or less than about 100 µm, about 50 µm, or about 20 µm.

Figure 7A:
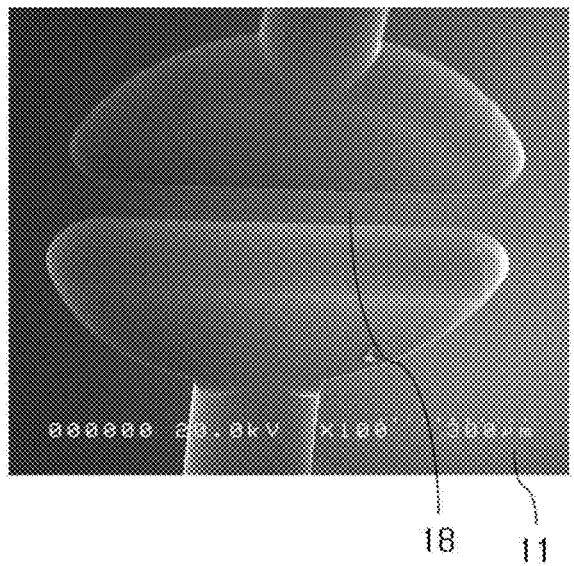
FIGS. 7A through 7C are microscopic images of the valve seat manufactured by the method of FIGS. 6A through 6D.
Figure 7B:
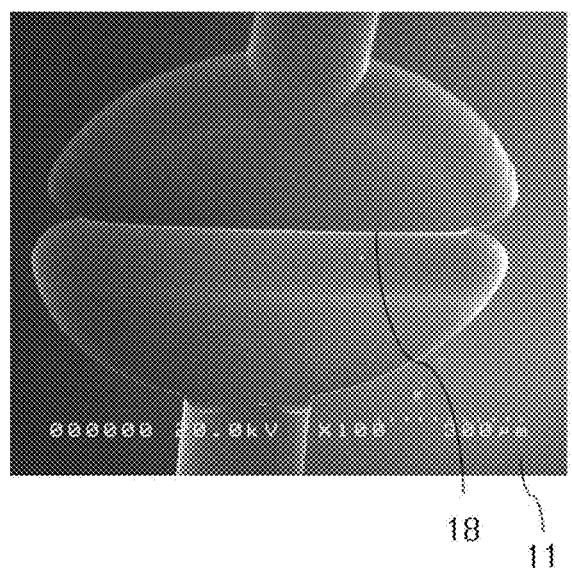
Figure 7C:
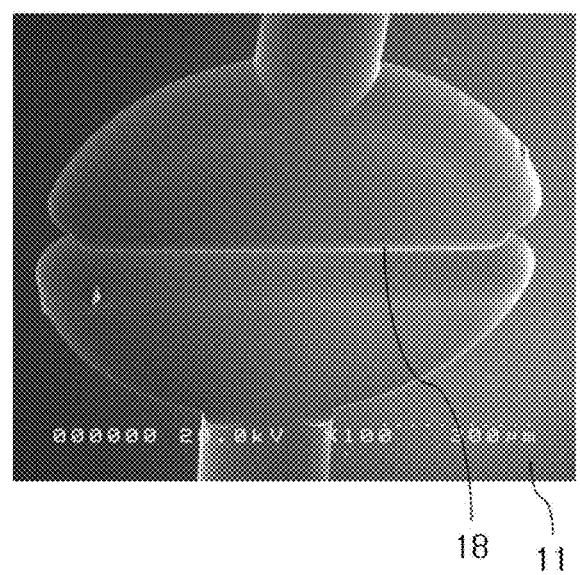

FIGS. 7A through 7C are microscopic images of the valve seat 18 manufactured by the method of FIGS. 6A through 6D. FIG. 7A shows an embodiment of the valve seat, in which $W_{ETCH}=300$ µm and $D_{GLASS}=100$ µm. In such an embodiment, the height of the valve seat 18 is substantially the same as the height of an upper surface of the first substrate 11, the width of the upper portion of the valve seat 18 is about 100 µm. FIG. 7B shows an embodiment of the valve seat, in which $W_{ETCH}=198$ µm and $D_{GLASS}=100$ µm. In such an embodiment, the height of the valve seat 18 is less than the height of the upper surface of the first substrate 11 by about 5 µm. Also, FIG. 7C shows an embodiment of the valve seat, in which $W_{ETCH}=190$ µm and $D_{GLASS}=100$ µm. In such an embodiment, the height of the valve seat 18 is less than the height of the upper surface of the first substrate 11 by about 20 µm. Accordingly, while maintaining an etching depth of the first substrate 11 to be constant, the height of the valve seat 18 may be easily changed according to the width $W_{ETCH}$ of the etching mask 30.

In an embodiment, although not shown in FIGS. 6A through 6D, the etching mask 30 and the photoresist 31 may also be coated and patterned on a surface of the second substrate 12, and then the air channel 16b and the air chamber 19 may be formed on the surface of the second substrate 12 by using a wet etching method.

After the reaction chamber 14, the fluidic channel 16a, the air channel 16b, the valve seat 18, the air chamber 19, and the first and second holes 15a and 15b are formed in the first and second substrates 11 and 12 as described above, the elastic film 13 is interposed between and is permanently bonded to the first and second substrates 11 and 12. For example, an embodiment of a bonding method is described below. Initially, the elastic film 13 is interposed between the first and second substrates 11 and 12. After that, the first and second substrates 11 and 12 and the elastic film 13 are processed using oxygen ($O_2$) plasma and then are heated in an oven to about 90° C., thereby completely and permanently bonding the elastic film 13 to the first and second substrates 11 and 12.

Figure 8:
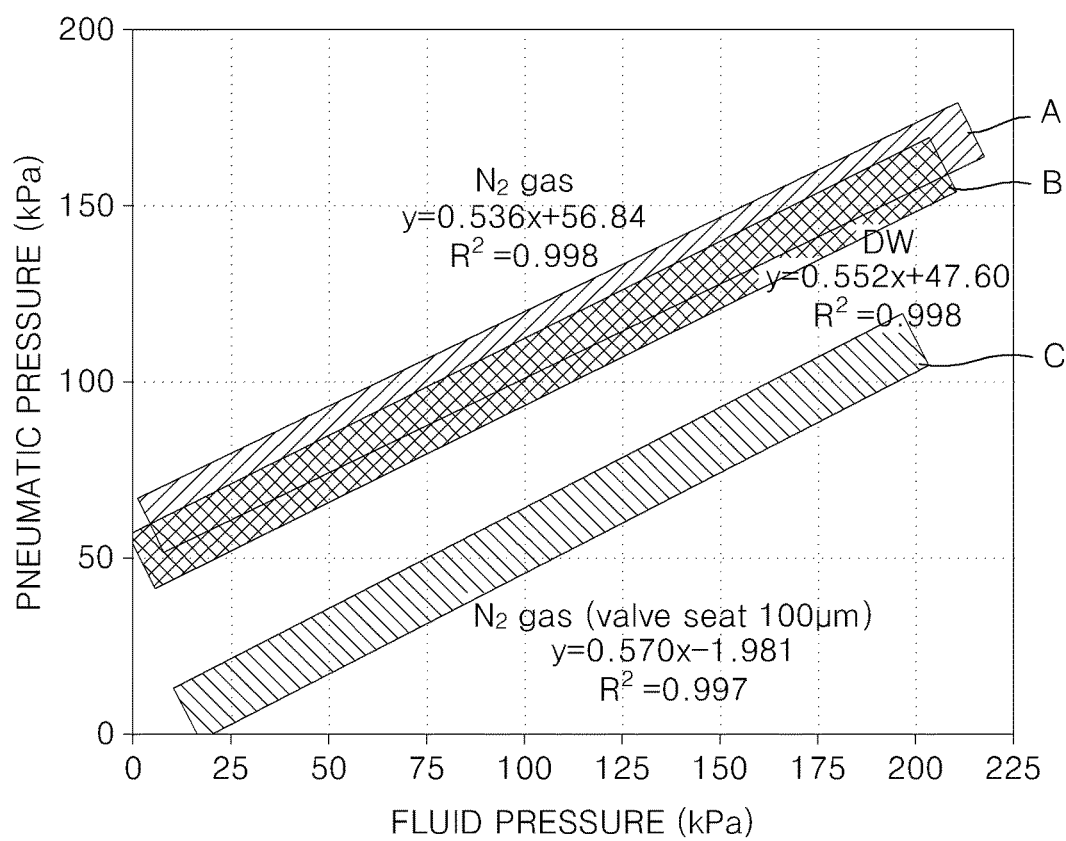
FIG. 8 is a graph illustrating pneumatic pressure (kPa) versus fluid pressure (kPa) to show operational characteristics of the microvalve device illustrated in FIG. 1.

FIG. 8 is a graph illustrating pneumatic pressure (kilopascal) versus fluid pressure (kilopascal) to show operational characteristics of the microvalve device 10 illustrated in FIG. 1. The graph of FIG. 8 shows a closing power of the microvalves 17. In FIG. 8, a first bar A represents a controlling air pressure applied to the air chambers 19 to completely block a flow of a fluid when a nitrogen ($N_2$) gas flows through the fluidic channels 16a in the microvalve device 10 having normally open type microvalves 17. Also, a second bar B represents a controlling air pressure applied to the air chambers 19 to completely block a flow of a fluid when deionized water ("DW") flows through the fluidic channels 16a in the microvalve device 10 having the normally open type microvalves 17. A third bar C represents a controlling air pressure applied to the air chambers 19 to completely block a flow of a fluid when a nitrogen ($N_2$) gas flows through the fluidic channels 16a in a microvalve device having a normally closed type microvalve. An embodiment of the microvalve device 10 having the normally open type microvalves 17 is manufactured by performing $O_2$ plasma processing on bonding surfaces between the first and second substrates 11 and 12 and the elastic film 13, and thus permanently bonding the elastic film 13 to the first and second substrates 11 and 12. In contrast, a conventional microvalve device having the normally closed type microvalves is manufactured without performing $O_2$ plasma processing and by mechanically compressing the first and second substrates 11 and 12 and the elastic film 13 from outside the microvalve device to prevent leakage of a fluid. The test is performed by closing the microvalves with a predetermined controlling air pressure in air chamber, varying a fluid pressure of a fluid in the fluidic channel, and checking the fluid pressure when the microvalves begin to be opened to flow the fluid.

Referring to FIG. 8, when the same $N_2$ gas is used in the cases corresponding to the first bar A and the third bar C, the first bar A (the normally open type microvalve) has a slope substantially similar to a slope of the third bar C (the normally closed type microvalve), but is shifted from the third bar C in a positive (+) direction along the y axis. This means that, since the elastic film 13 is bent toward the valve seat 18 in the normally open type microvalve, a pressure greater than at least about 50 kilopascal (kPa) is additionally required to close the normally open type microvalve. When DW is flowed through the normally open type microvalve, the second bar B (the DW) illustrates operation characteristics similar to those of the first bar A (the $N_2$ gas). If the height of the valve seat 18 is less than the height of an upper surface of the first substrate 11 by about 5 μm, in comparison to the normally closed type microvalve, pressures of 56.84 kPa and 47.6 kPa are additionally required to block the flows of the $N_2$ gas and the DW, respectively. If the height of the valve seat 18 is lowered, an additional pressure for closing the microvalve is increased.

It should be understood that the embodiments described herein should be considered in a descriptive sense only and not for purposes of limitation. Descriptions of features or aspects within each embodiment should typically be considered as available for other similar features or aspects in other embodiments.

What is claimed is:

1. A microvalve device comprising:
   a first substrate having at least one fluidic channel and at least one valve seat disposed in the fluidic channel;
   a second substrate having at least one air channel and at least one air chamber connected to the at least one air channel; and
   an elastic film interposed between the first substrate and the second substrate,
   wherein a height of the valve seat is less than a depth of the fluidic channel and is greater than zero, and
   the elastic film is configured to block a fluid communication between the air chamber and the fluid channel at all air pressures in the air chamber.

2. The microvalve device of claim 1, wherein, when a controlling air pressure is not applied to the air chamber through the air channel, the upper portion of the valve seat is spaced apart from the elastic film.

3. The microvalve device of claim 2, wherein a distance between the upper portion of the valve seat and the elastic film is greater than zero micrometer and less than or equal to about 100 micrometers.

4. The microvalve device of claim 2, wherein a distance between the upper portion of the valve seat and the elastic film is greater than zero micrometer and less than or equal to about 50 micrometers.

5. The microvalve device of claim 2, wherein a distance between the upper portion of the valve seat and the elastic film is greater than zero micrometer and less than or equal to about 20 micrometers.

6. The microvalve device of claim 1, wherein, when a controlling air pressure is applied to the air chamber through the air channel, the elastic film is deflected to contact the valve seat and blocks a flow of a fluid in the fluidic channel.

7. The microvalve device of claim 1, wherein the at least one fluidic channel is disposed in a first surface of the first substrate, the at least one air chamber is disposed in a second surface of the second substrate, and the first surface of the first substrate and the second surface of the second substrate are disposed to face each other.

8. The microvalve device of claim 7, wherein the fluidic channel is recessed into the first surface of the first substrate and the valve seat protrudes from a bottom surface of the fluidic channel.

9. The microvalve device of claim 8, wherein the valve seat is formed along a direction substantially perpendicular to a width direction of the fluidic channel.

10. The microvalve device of claim 7, wherein the air chamber is recessed into the second surface of the second substrate.

11. The microvalve device of claim 1, wherein the air chamber and the valve seat are formed to face each other.

12. The microvalve device of claim 11, wherein the air chamber and the valve seat have substantially the same width.

13. The microvalve device of claim 1, further comprising:
    a plurality of first holes connected to the fluidic channel, the plurality of first holes being disposed in the first substrate and opposite to the fluidic channel; and
    a plurality of second holes connected to the air channel, the plurality of second holes being disposed in the second substrate and opposite to the air channel.

14. The microvalve device of claim 1, further comprising at least one reaction chamber disposed in the first substrate or the second substrate.

15. The microvalve device of claim 1, wherein the elastic film comprises polydimethylsiloxane.

16. The microvalve device of claim 1, wherein the first substrate and the second substrate comprise glass or plastic.

17. The microvalve device of claim 1, wherein the height of the valve seat is measured from the bottom of the fluidic channel toward a surface of the first substrate facing the second substrate.

18. A microvalve device comprising:
    a first substrate having at least one fluidic channel and at least one valve seat disposed in the fluidic channel;
    a second substrate having at least one air channel and at least one air chamber connected to the at least one air channel; and
    an elastic film interposed between the first substrate and the second substrate, the elastic film being configured to block a fluid communication between the air chamber and the fluid channel at all air pressures in the air chamber,
    wherein:
    when a controlling air pressure is not applied to the air chamber through the air channel, the upper portion of the valve seat is spaced apart from the elastic film such that a fluid flows through the fluidic channel,
    when the controlling air pressure is applied to the air chamber through the air channel, the elastic film is deflected to contact the valve seat and block a flow of a fluid in the fluidic channel.

19. The microvalve device of claim 18, wherein, when a controlling air pressure is not applied to the air chamber through the air channel, a distance between the upper portion of the valve seat and the elastic film is greater than zero micrometer and less than or equal to about 100 micrometers.

20. The microvalve device of claim 18, wherein a height of the valve seat is less than a depth of the fluidic channel and is greater than zero.

* * * * *